US012594915B2

(12) United States Patent
Kasuya et al.

(10) Patent No.: US 12,594,915 B2
(45) Date of Patent: Apr. 7, 2026

(54) BRAKE FORCE DISTRIBUTION DEVICE FOR VEHICLE AND METHOD THEREOF

(71) Applicant: Honda Motor Co., Ltd., Tokyo (JP)

(72) Inventors: Kentaro Kasuya, Tokyo (JP); Shuichi Okada, Tokyo (JP); Ryo Koyama, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 67 days.

(21) Appl. No.: 18/608,959

(22) Filed: Mar. 19, 2024

(65) Prior Publication Data

US 2024/0425023 A1     Dec. 26, 2024

(30) Foreign Application Priority Data

Jun. 21, 2023    (CN) .......................... 202310737972.8

(51) Int. Cl.
| | |
|---|---|
| *B60T 8/24* | (2006.01) |
| *B60T 7/12* | (2006.01) |
| *B60T 8/171* | (2006.01) |
| *B60T 8/172* | (2006.01) |
| *B60T 8/26* | (2006.01) |
| *B60T 8/58* | (2006.01) |

(52) U.S. Cl.
CPC ................ *B60T 8/246* (2013.01); *B60T 7/12* (2013.01); *B60T 8/171* (2013.01); *B60T 8/172* (2013.01); *B60T 8/26* (2013.01); *B60T 8/58* (2013.01); *B60T 2210/32* (2013.01); *B60T 2220/03* (2013.01); *B60T 2250/03* (2013.01); *B60T 2250/04* (2013.01)

(58) Field of Classification Search
CPC . B60T 8/246; B60T 7/12; B60T 8/171; B60T 8/172; B60T 8/26; B60T 8/58; B60T 2210/32; B60T 2220/03; B60T 2250/03; B60T 2250/04; B60T 7/22; B60T 8/24; B60T 8/32; B60T 2250/00
See application file for complete search history.

(56) References Cited

U.S. PATENT DOCUMENTS

2012/0316733 A1*  12/2012  Futamura .............. B60T 8/1755
                                                        701/42

FOREIGN PATENT DOCUMENTS

JP          2008126858        6/2008

* cited by examiner

*Primary Examiner* — Grant Moubry
*Assistant Examiner* — Ruben Picon-Feliciano
(74) *Attorney, Agent, or Firm* — JCIPRNET

(57) ABSTRACT

Disclosed are a brake force distribution device for vehicle and method thereof. The brake force distribution device for vehicle includes: a turning state detection part detecting whether the vehicle is in a turning state based on the driving state of the vehicle; a vehicle speed detection part detecting whether the vehicle speed is equal to or less than a pre-scribed threshold; a first yaw moment calculation part calculating the first yaw moment based on the driving state of the vehicle, the vehicle speed and the first wheelbase; a second yaw moment calculation part calculating the second yaw moment based on the driving state and the vehicle speed as well as based on the second wheelbase which is the inherent value of the vehicle; and a target moment calculation part calculating a target moment based on the difference between the first yaw moment and the second yaw moment.

10 Claims, 5 Drawing Sheets

BRAKE FORCE DISTRIBUTION DEVICE FOR VEHICLE AND METHOD THEREOF

CROSS-REFERENCE TO RELATED APPLICATION

This application claims the priority benefit of China application no. 202310737972.8, filed on Jun. 21, 2023. The entirety of the above-mentioned patent application is hereby incorporated by reference herein and made a part of this specification.

BACKGROUND

Technical Field

The disclosure relates to a brake force distribution device for vehicle and method thereof.

Description of Related Art

In recent years, in order to provide access to sustainable transportation system for disadvantageous people such as the elderly, handicapped people, or children, proactive efforts have been made to achieve the above goal. To achieve the above-mentioned purpose, research and development are devoted to further improving the safety and convenience of transportation through developments related to the operation safety of vehicles.

Patent Literature 1 (JP Laid-Open No. 2008-126858) discloses the following technology. When parking in a narrow parking lot and the vehicle turns at low speed, the target pressure amount of the brake is set based on the opening of the accelerator. Moreover, the brake force difference between the left and right wheels of the vehicle is adjusted based on this target pressure amount as well as a turning radius smaller than the turning radius based on the inherent characteristics of the vehicle.

In order to further improve the turning performance of a vehicle with a long wheelbase, the turning operation of a vehicle with a short wheelbase (such as a lightweight car) serves as an ideal operation, and control is performed in a manner to achieve the ideal turning operation.

However, in terms of vehicle operation safety, how to improve the turning characteristics of long-wheelbase vehicles under low-speed turning is an issue to be solved.

SUMMARY

In order to solve the above-mentioned problem, the disclosure aims to improve the turning performance of a long-wheelbase vehicle for turning in low speeds, and contributes to the development of sustainable transportation systems.

According to an embodiment of the present disclosure, a brake force distribution device for vehicle is provided. The brake force distribution device for vehicle includes: a turning state detection part, which is disposed to detect whether the vehicle is in a turning state based on the driving state of the vehicle; a vehicle speed detection part, which is disposed to detect whether the vehicle speed is equal to or less than a prescribed threshold; a first yaw moment calculation part, which calculates the first yaw moment based on the driving state, the vehicle speed and the first wheelbase of the vehicle, wherein the first wheelbase is the imaginary wheelbase of the vehicle; a second yaw moment calculation part, which calculates the second yaw moment based on the driving state and the vehicle speed as well as based on the second wheelbase which is the inherent value of the vehicle; a target moment calculation part, which calculates a target moment based on the difference between the first yaw moment and the second yaw moment; and a brake force distribution control part, which controls the brake force distribution of the wheels of the vehicle based on the target moment. The brake force distribution control part controls the brake force distribution of the wheels based on the target moment when the vehicle turns and the vehicle speed is equal to or less than a prescribed threshold.

According to another embodiment of the present disclosure, a brake force distribution method for vehicle is provided, which includes: detecting whether the vehicle is in a turning state based on the driving state of the vehicle; detecting whether the vehicle speed is equal to or less than a prescribed threshold; calculating the first yaw moment based on the driving state, the vehicle speed and the first wheelbase of the vehicle, wherein the first wheelbase is the imaginary wheelbase of the vehicle; calculating the second yaw moment based on the driving state and the vehicle speed as well as based on the second wheelbase which is the inherent value of the vehicle; calculating a target moment based on the difference between the first yaw moment and the second yaw moment; and controlling the brake force distribution of the wheels of the vehicle based on the target moment when the vehicle turns and the vehicle speed is equal to or less than a prescribed threshold.

According to the above-described embodiment, for example, the turning performance may be improved even when the vehicle is turning at low speeds, such as when the vehicle turns around or parks in a narrow parking lot, and even a vehicle with a long wheelbase may be controlled to operate like a vehicle with a short wheelbase.

Figure 6:
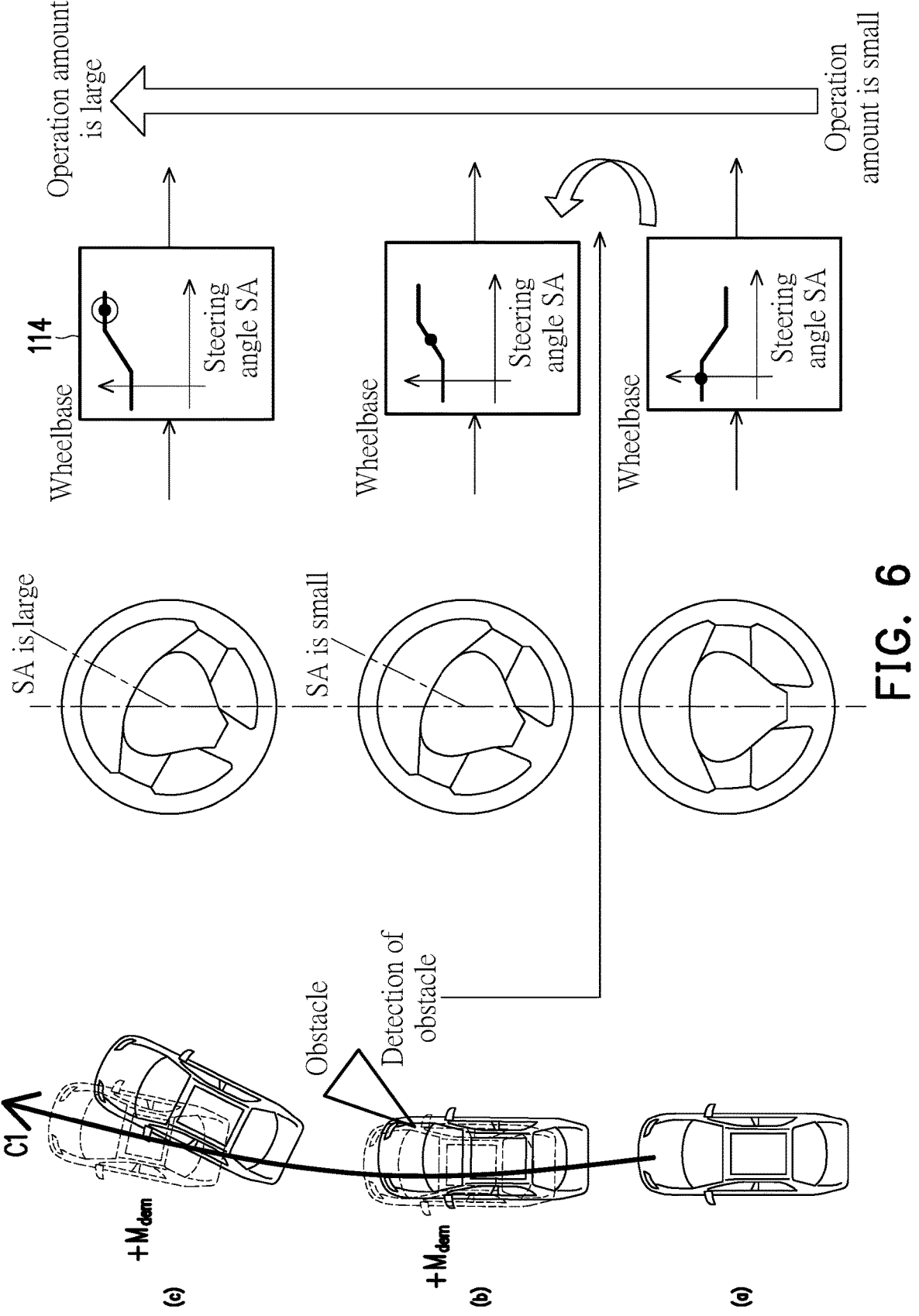

(a) to (c) in FIG. 6 show schematic diagrams of situations of brake force distribution for vehicle illustrated according to another embodiment of the present disclosure.

DESCRIPTION OF THE EMBODIMENTS

Reference will now be made in detail to the exemplary embodiments of the present disclosure, examples of which are illustrated in the accompanying drawings. Whenever possible, the same reference numbers are used in the drawings and descriptions to refer to the same or similar parts.

According to an embodiment of the present disclosure, in the above brake force distribution device for vehicle, the driving state may include: a steering angle. The brake force distribution device for vehicle further includes: a first wheelbase setting part that sets the first wheelbase based on the steering angle. When the vehicle turns and the vehicle speed is below the prescribed threshold, the first wheelbase setting part is set such that the first wheelbase is less than or equal to the second wheelbase. Moreover, within a prescribed interval, the first wheelbase is set in such a way that the greater the current steering angle is, the smaller the value of the first wheelbase is.

According to an embodiment of the present disclosure, in the above brake force distribution device for vehicle, the first wheelbase has a hysteresis characteristic. When the steering angle increases and the steering angle becomes a first threshold, the first wheelbase is set to a minimum value, and then, when the steering angle decreases and becomes a second threshold less than the first threshold, the first wheelbase increases from the minimum value. The decreased steering angle is less likely to increase as compared with the increased steering angle.

According to an embodiment of the present disclosure, the brake force distribution device for vehicle further includes: an obstacle detection part, which detects obstacles around the vehicle; a contact judgment part, which determines the possibility of the obstacle coming into contact with the inner side of the turning direction of the vehicle based on the obstacle; and a first wheelbase setting part, which sets the first wheelbase based on the judgment result of the contact judgment part. When the vehicle is turning and the vehicle speed is equal to or less than the prescribed threshold, and it is determined that there is a possibility of contact between the obstacle and the vehicle, the first wheelbase setting part sets the first wheelbase to a value greater than the current value.

According to an embodiment of the present disclosure, in the above brake force distribution device for vehicle, the driving state includes: a steering angle. The first wheelbase setting part sets the first wheelbase based on the judgment result of the contact judgment part and the steering angle. When the vehicle is turning and the vehicle speed is equal to or less than the prescribed threshold and the contact judgment part determines that there is a possibility of contact between the obstacle and the vehicle, the first wheelbase setting part is set in such a way that the first wheelbase is greater than or equal to the second wheelbase. Moreover, within the prescribed interval, the first wheelbase is set in such a way that the greater the current steering angle is, the greater the value of the first wheelbase is.

Figure 1:
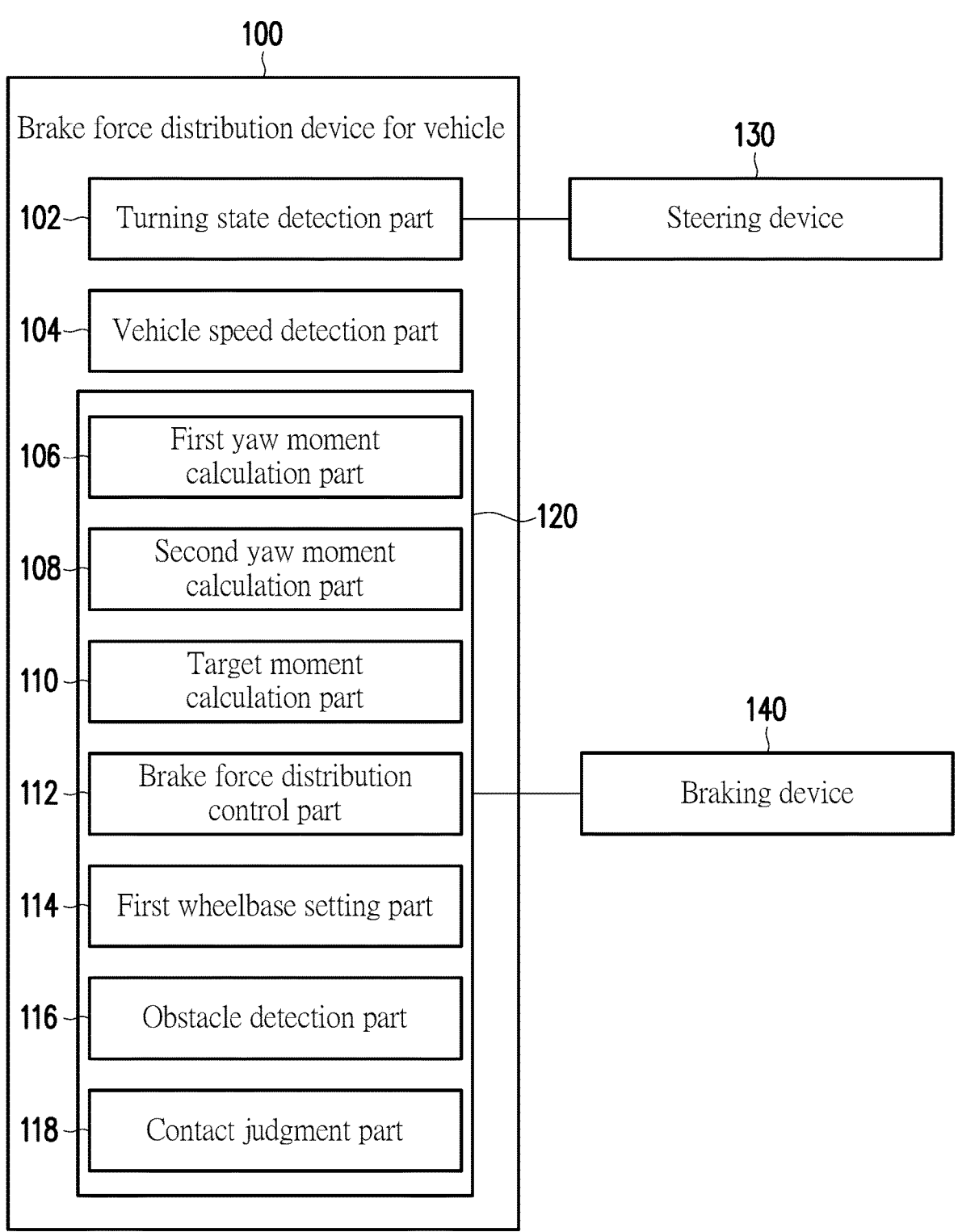
FIG. 1 is a block schematic diagram of a brake force distribution device for vehicle illustrated according to an embodiment of the present disclosure.

FIG. 1 is a block schematic diagram of a brake force distribution device for vehicle illustrated according to an embodiment of the present disclosure. As shown in FIG. 1, the brake force distribution device 100 for vehicle at least includes but is not limited to: a turning state detection part 102, a vehicle speed detection part 104, a first yaw moment calculation part 106, a second yaw moment calculation part 108, a target moment calculation part 110 and a brake force distribution control part 112. In addition, the brake force distribution device 100 for vehicle may also at least include but not limited to: a steering device 130 and a braking device 140.

The turning state detection part 102 detects whether the vehicle is in a turning state based on the driving state of the vehicle. The turning state may be determined, for example, based on the steering angle SA (or turning angle) of the steering wheel (steering device 130) in the vehicle. In an example, the turning state detection part 102 may be implemented through a sensor mounted on the steering device 130 and the control part 120. The sensor is disposed to detect the operating angle of the steering device 130 relative to a reference position to determine whether the vehicle is in a turning state. The reference position may generally be a position where the steering device 130 is in a position where the steering wheels of the vehicle (for example, the left and right wheels at front) keep the vehicle going straight. The operating angle of the steering device 130 detected by the sensor may be processed and analyzed by the control part 120 on signal to determine whether the vehicle is in a turning state.

The vehicle speed detection part 104 is disposed to detect whether the vehicle speed V is equal to or less than a prescribed threshold. The vehicle speed detection part 104 may be implemented by the vehicle speed sensor and the control part 120, for example. The vehicle speed sensor is, for example, a sensor mounted near the wheel to detect the rotation speed in order to obtain the vehicle speed V. The vehicle speed V may also be detected using various available sensors, such as image analysis and processing after capturing images by a camera, radar, LiDAR and other available technical means, which are not particularly limited by the present disclosure. When the vehicle speed sensor detects the vehicle speed V of the vehicle, the control part 120 may compare the detected vehicle speed V with a prescribed threshold and determine whether the vehicle speed V is equal to or less than the prescribed threshold.

The first yaw moment calculation part 106 calculates the first yaw moment (or referred to as ideal yaw moment) M_ideal based on the driving state detected by the turning state detection part 102, the vehicle speed V detected by the vehicle speed detection part 104, and the first wheelbase L1 of the vehicle. Here, the first wheelbase L1 is the imaginary wheelbase (ideal wheelbase) of the vehicle. In this embodiment, when a vehicle with a long wheelbase (second wheelbase L2) turns at a low speed, the control part 120 described later will control the distribution of brake force to the wheels of the vehicle, so that the vehicle is able to make a turn with a shorter wheelbase (first wheelbase L1) to improve the turning performance of the vehicle. In other words, even a vehicle with a long wheelbase may be made to operate like a vehicle with a short wheelbase when cornering at low speeds.

The second yaw moment calculation part 108 calculates the second yaw moment (or referred to as actual yaw moment) M_real based on the driving state detected by the turning state detection part 102 and the vehicle speed V detected by the vehicle speed detection part 104, as well as based on the second wheelbase L2 which is the inherent value of the vehicle. Here, the second wheelbase L2 is a characteristic value of the vehicle itself, that is, an inherent value, which generally refers to the distance between the centers of the front and rear wheels of the vehicle, and is a fixed value.

The target moment calculation part 110 calculates the target moment M_dem based on the difference between the first yaw moment M_ideal and the second yaw moment M_real.

The brake force distribution control part 112 is based on the target moment M_dem and controls the brake force distribution amounts FR, FL, RR, and RL of the wheels of the vehicle. For example, the brake force distribution control part 112 controls the brake force distribution amounts FR, FL, RR, and RL of the wheels based on the target moment M_dem when the vehicle is in a turning state and the vehicle speed is equal to or less than the prescribed threshold. Here, the situation where the vehicle speed V is equal to or less than the prescribed threshold may be the situation where the vehicle is stopped or at a low speed state that the control part 120 determines to be close to the stopping state or below the first prescribed value, for example, a situation where the smart parking assisting system is activated. The brake force distribution control performed by the brake force distribution control part 112 is a vectoring control. In particular, when the vehicle turns, the brake force and turning radius of each of the left and right front wheels and the left and right rear wheels may be controlled.

Through the brake force distribution device for vehicle of this embodiment, when the vehicle turns at low speed, the larger the steering angle, the closer the vehicle is to the target operation, that is, the vehicle turns in the operation mode of a vehicle with a short wheelbase.

Moreover, each of the first yaw moment calculation part 106, the second yaw moment calculation part 108, the target moment calculation part 110 and the brake force distribution control part 112 illustrated in FIG. 1 may be implemented by the control part 120. The turning state detection part 102, the vehicle speed detection part 104, the yaw rate detection part not shown, and other devices may be controlled by the control part 120.

The control part 120 is disposed to control the vehicle. The control part 120 may control various operation modes of the vehicle, such as acceleration and deceleration, parking, avoidance, etc., and may also detect vehicle status or surrounding status of vehicle by controlling various sensors and detectors. For those skilled in the art, various control methods of the control part 120 may be designed according to actual needs. The control part 120 may be implemented by a processor, such as an ECU (Electronic Control Unit) of the vehicle. The ECU may be used to control various sensors and detectors of the vehicle. Therefore, the control part 120 may receive data, perform various processing and judgment on the data, and then control various actuating components of the vehicle. Various system controls in the vehicle are controlled by the ECU, such as starting the vehicle (such as the power switch (starting switch)), inspecting various parts after starting, controlling the vehicle monitor, etc.

Figure 2:
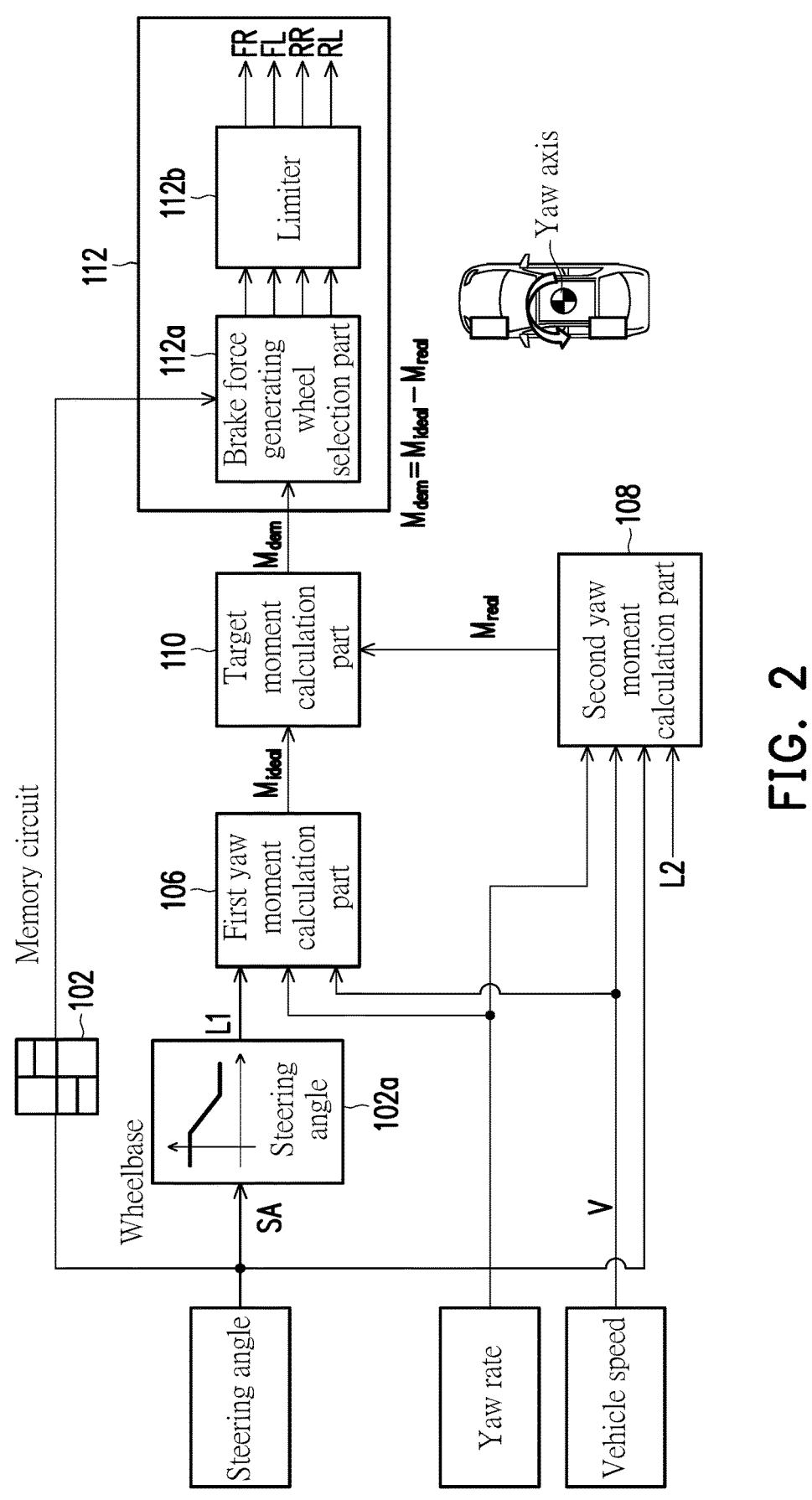
FIG. 2 is a schematic circuit diagram of a brake force distribution device for vehicle illustrated according to an embodiment of the present disclosure.

FIG. 2 is a schematic circuit diagram of a brake force distribution device for vehicle illustrated according to an embodiment of the present disclosure. As shown in FIG. 2, the brake force distribution device 100 for vehicle may receive steering angle SA, yaw rate and vehicle speed V. As mentioned above, the steering angle SA may be detected by the turning state detection part 102, for example, by a steering angle sensor mounted on the steering device 130. The yaw rate may be regarded as an angular velocity in the yaw axis direction and may be detected by a yaw sensor not shown. The vehicle speed V may be detected through the vehicle speed detection part 104.

Furthermore, the steering angle detected by the turning state detection part 102 may be used by the control part 120 to determine whether the vehicle is in the turning state and the turning direction of the vehicle. In an example, the brake force distribution device 100 for vehicle may further include: the first wheelbase setting part 114 may set the first wheelbase (ideal wheelbase) L1 based on the steering angle SA. The first wheelbase setting part 114 may perform search using a steering angle map, for example. As shown in FIG. 2, when the vehicle is turning and the vehicle speed is below a prescribed threshold, the first wheelbase setting part (steering angle map) 114 is set such that the first wheelbase L1 is less than or equal to the second wheelbase L2, and within a prescribed interval, the first wheelbase L1 is set such that the larger the current steering angle SA is, the smaller the value of the first wheelbase L1 is.

In this way, this embodiment may set the ideal wheelbase (first wheelbase) L1 based on the steering angle SA of the vehicle. In this manner, when the difference between the target yaw moment and the actual yaw moment increases, the target yaw moment also increases, and as the target yaw moment increases, the effect of a vehicle with a long wheelbase turning with a small radius may be achieved.

The first yaw moment calculation part 106 calculates and outputs the first yaw moment (ideal yaw moment) M_ideal based on the driving state (which may include steering angle, yaw rate, etc.) detected by the turning state detection part 102, the vehicle speed V detected by the vehicle speed detection part 104, and the first wheelbase (imaginary wheelbase, ideal wheelbase) L1 of the vehicle.

Moreover, the second yaw moment calculation part 108 calculates and outputs the second yaw moment (actual yaw moment) M_real based on the driving state (which may include steering angle, yaw rate, etc.) detected by the turning state detection part 102 and the vehicle speed V detected by the vehicle speed detection part 104, as well as based on the second wheelbase L2 which is the inherent value of the vehicle. Here, the second wheelbase L2 is a characteristic value of the vehicle itself, i.e., the inherent value, and may be input from a memory operating in cooperation with the control part 120, for example.

Also, the target moment calculation part 110 receives the first yaw moment (ideal yaw moment) M_ideal from the first yaw moment calculation part 106 and the second yaw moment (actual yaw moment) M_real from the second yaw moment calculation part 108 to calculate and output the target moment M_dem. The target moment M_dem is calculated using the following equation (1).

$$M\_dem = M\_ideal - M\_real \qquad (1)$$

Moreover, the first yaw moment M_ideal and the second yaw moment M_real may be calculated based on the following equation (2).

$$\rho = \frac{V}{r} = \left( \frac{1}{1 + M\frac{1}{L}\left(\frac{1}{K_f} + \frac{1}{K_r}\right)} \right)\frac{1}{\delta} \qquad (2)$$

In the equation, T is the torque, $\rho$ is the turning radius, M is the yaw moment, $\delta$ is the steering angle, V is the vehicle speed, r is the yaw rate, Kf is the front wheel cornering force, Kr is the rear wheel cornering force, and L is the wheelbase.

Additionally, the brake force distribution control part 112 controls the brake force distribution amounts FR, FL, RR, and RL of the wheels (taking a four-wheeled vehicle as an example, the wheels refer to the front, rear, left, and right wheels) of the vehicle based on the target moment M_dem. In an example, the brake force distribution control part 112 may include a brake force generating wheel selection part 112a and a limiter 112b.

The brake force generating wheel selection part 112a may determine which wheels to select as the individual brake forces to be controlled based on the state of the vehicle detected by the turning state detection part 102, such as the turning direction. The limiter 112b may limit the upper limit of the brake force of each wheel. In this way, the brake force distribution control part 112 may control the brake force distribution amounts FR, FL, RR, and RL of each wheel of the vehicle based on the target moment M_dem. Accordingly, the control part 120 may control the actuator (not shown) of each wheel of the braking device 140 based on the brake force distribution amounts FR, FL, RR, and RL of each wheel to control the brake force of each wheel.

Therefore, because the brake force distribution control in this embodiment takes into consideration the vehicle's own wheelbase (second wheelbase) L2 and the ideal wheelbase (first wheelbase) L1 to generate the target moment M_dem, when the vehicle with long wheelbase makes a turn at a low speed, the vehicle may be controlled in the operation mode like a vehicle with a short wheelbase. Accordingly, when the vehicle turns at low speeds such as making a reverse turn or parking in a narrow parking lot, the turning performance may be improved.

Figure 3:
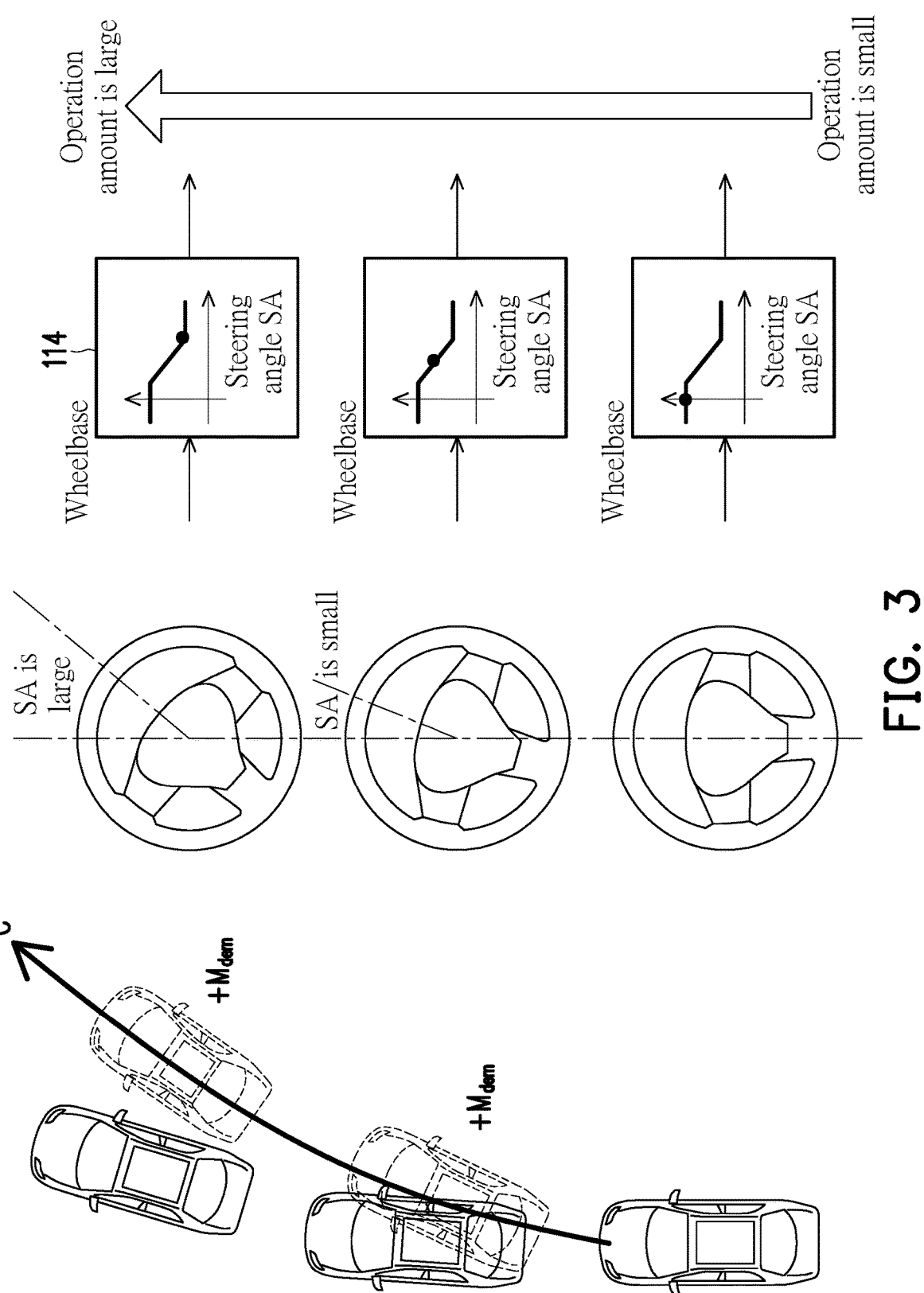
FIG. 3 is a schematic diagram of a situation of brake force distribution for vehicle illustrated according to an embodiment of the present disclosure.

FIG. 3 is a schematic diagram of a situation of brake force distribution for vehicle illustrated according to an embodiment of the present disclosure. As described above, the first wheelbase setting part 114 sets the first wheelbase L1 such that the larger the current steering angle SA is, the smaller the value of the first wheelbase L1 is. As shown in FIG. 3, when a vehicle with a long wheelbase turns at a low speed, the turning radius of such vehicle is larger. Under the circumstances, the vehicle may be set to operate in the short-wheelbase vehicle operation mode to control the brake force of each wheel. When the steering device 130 is not operated, the steering angle SA is 0, and the wheelbase is the largest under the circumstances. As the operation amount of the steering device 130 gradually increases, the steering angle SA gradually increases, and the wheelbase gradually decreases. When the operation amount of the steering device 130 continues to increase, the steering angle SA also continues to increase, and the wheelbase further decreases.

According to an embodiment of the present disclosure, when the steering device 130 is operated, the target yaw moment M_dem is also applied to make the turning radius smaller. In this way, the vehicle may turn along the trajectory C (the driving route of the vehicle illustrated in dashed line), so even a vehicle with a long wheelbase may be controlled in the operation mode of a short-wheelbase vehicle.

By continuously reducing the first wheelbase L1 in accordance with the current steering angle, even a long-wheelbase vehicle may be smoothly transformed to operate like a short-wheelbase vehicle, thereby reducing discomfort caused by changes in vehicle operation. If the target moment M_dem is set to a constant, the vehicle will vibrate. Furthermore, according to this embodiment, the turning performance of the vehicle in turning at low speeds may also be improved.

Figure 4:
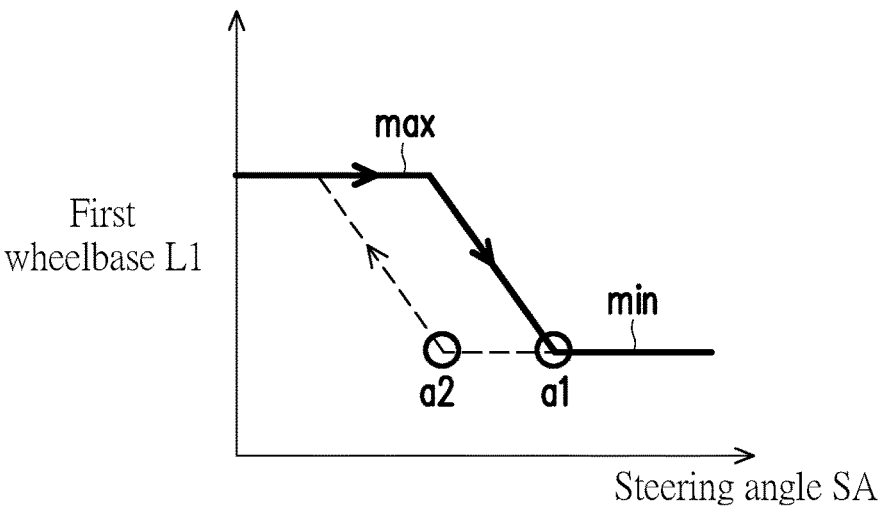
FIG. 4 is an explanatory diagram illustrating the hysteresis characteristics of the first wheelbase according to the embodiment of the present disclosure.

FIG. 4 is an explanatory diagram illustrating the hysteresis characteristics of the first wheelbase according to an embodiment of the present disclosure. According to the embodiment of the present disclosure, the above-mentioned first wheelbase L1 is set to have hysteresis characteristics. As shown in FIG. 4, when the steering angle SA gradually increases, the length of the first wheelbase near the reference position of the steering device 130 is the same as the length of the second wheelbase, but a dead zone (an interval in which the length of the first wheelbase does not change) is set near the reference position. When the steering angle SA exceeds the angle of the dead zone, the first wheelbase L1 gradually becomes smaller. When the steering angle SA becomes the first threshold a1, the first wheelbase is set to the minimum value min. Thereafter, even if the steering angle SA increases, the length of the first wheelbase L1 remains unchanged. Then, when the steering angle SA decreases, even if the steering angle SA becomes the first threshold a1, the length of the first wheelbase L1 does not change. When the steering angle SA becomes the second threshold a2 less than the first threshold a1, the first wheelbase L1 increases from the minimum value min and gradually increases as the steering angle SA decreases. When the position of the steering device 130 is near the reference position, the first wheelbase L1 becomes a length equal to the second wheelbase L2. In other words, as a time point when the length of the first wheelbase L1 starts to change, the second threshold a2 is not considered when the steering angle SA increases, and the first threshold a1 is not considered when the steering angle SA decreases. Therefore, when the steering angle SA decreases, the first wheelbase L1 is less likely to increase as compared to the condition where the steering angle SA increases.

By setting the first wheelbase (ideal wheelbase) L1 to have a hysteresis characteristic, since the first wheelbase L1 becomes difficult to return when the steering device 130 is turned reversely, compared with the conventional technology without the hysteresis characteristic, it is possible to prevent hunting as the steering angle increases or decreases, that is, the problem of being unable to stabilize around the indicated target value and fluctuating up and down.

Furthermore, according to an embodiment of the present disclosure, the brake force distribution device 100 for vehicle may also include: an obstacle detection part 116 and a contact judgment part 118. The obstacle detection part 116 is disposed to detect obstacles around the vehicle, such as other vehicles, people, guard pipes, guard poles, etc. The obstacle detection part 116 may be, for example, a camera mounted around the vehicle to capture images around the vehicle, and the control part 120 or an independent image processing part determines whether there are obstacles around the vehicle through image analysis or the like. The obstacle detection part 116 may also use a laser device to detect whether there are obstacles near the vehicle. The obstacle detection part 116 may further use any other sensors or detection equipment mounted on the vehicle to detect obstacles.

The contact judgment part 118 is disposed to determine the possibility of contact (collision) between the obstacle and the inner side of the turning direction of the host vehicle based on the above-mentioned obstacle. The contact judgment part 118 may be implemented by the control part 120, for example. For example, the contact judgment part 118 may determine the possibility of the obstacle coming into contact with the inner side of the turning direction of the host vehicle based on the distance between the vehicle and the obstacle detected by the obstacle detection part 116.

Under the circumstances, the first wheelbase setting part 114 may set the first wheelbase L1 based on the judgment result of the contact judgment part 118. When the vehicle is turning and the vehicle speed V is equal to or less than the prescribed threshold, and it is determined that there is a possibility of contact between the obstacle and the vehicle, the first wheelbase setting part 114 sets the first wheelbase L1 to a value greater than the current value.

Contrary to the previously described embodiments, the above description is to allow the vehicle to operate like a short-wheelbase vehicle when turning at low speeds, using a smaller turning radius to control the turning of the vehicle. However, during this control process, if an obstacle appears near the vehicle and the obstacle is likely to come into contact with the vehicle, if this control method is performed continuously, the probability of the vehicle coming into contact with the obstacle might increase.

Figure 5:
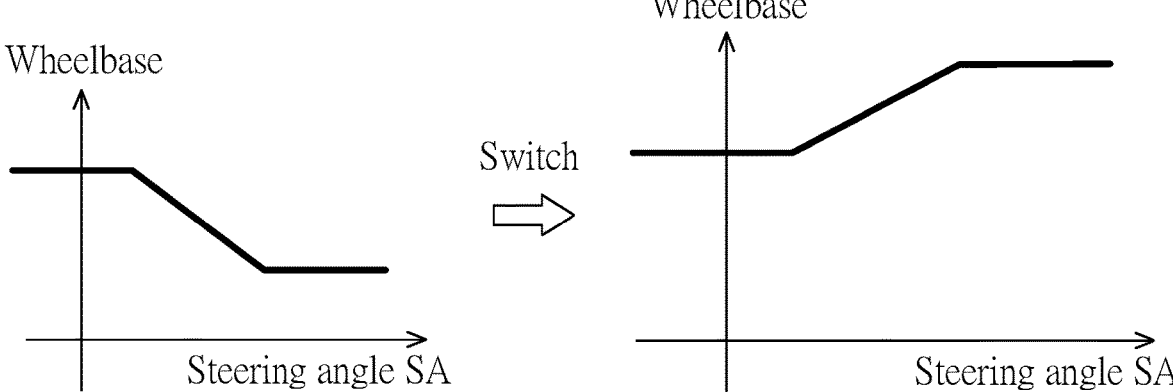
FIG. 5 is a schematic diagram showing changes of a wheelbase steering angle map.

As shown in FIG. 5, when the obstacle detection part 116 detects the existence of an obstacle near the vehicle, and the contact judgment part 118 determines that the obstacle will contact the vehicle, the steering angle map in the first wheelbase setting part 114 is changed from the control method on the left to the control method on the right. In the steering angle map on the left side of FIG. 5, within the prescribed interval, as the steering angle SA increases, the wheelbase (first wheelbase) L1 gradually becomes smaller. On the contrary, in the steering angle map on the right side of FIG. 5, as the steering angle SA increases, the wheelbase (first wheelbase) L1 gradually becomes larger.

In other words, when there is an obstacle near the vehicle that might come into contact with the vehicle, the first wheelbase setting part 114 changes the change mode between the first wheelbase L1 and the steering angle. When the first wheelbase setting part 114 changes the steering angle map to the control method on the right side of FIG. 5, once the contact judgment part 118 determines that the obstacle will contact the vehicle, the control part 120 changes the steering angle map through the first wheelbase setting part 114 to distribute the brake force of the wheels of the vehicle. As a result, the vehicle may turn with a larger turning radius to avoid contact with obstacles.

In another case, the first wheelbase setting part 114 may set the first wheelbase L1 based on the judgment result of the contact judgment part 118 and the steering angle SA. When the vehicle is turning and the vehicle speed is equal to or less than the prescribed threshold, when the contact judgment part 118 determines the possibility of contact between the obstacle and the vehicle, the first wheelbase setting part 114 sets the first wheelbase L1 to be greater than or equal to the second wheelbase L2, and within the prescribed interval, the first wheelbase L1 is set such that the larger the current steering angle SA is, the larger the value of the first wheelbase L1 is. Thereby, the first wheelbase gradually increases or increases level by level along with the steering angle SA. In this example, when the vehicle is involved in a risk of coming to contact with an obstacle, the first wheelbase L1 is increased to perform brake force distribution control on the wheels of the vehicle, thereby avoiding contact (collision) with the obstacle.

(a) to (c) in FIG. 6 show schematic diagrams of situations of brake force distribution for vehicle illustrated according to another embodiment of the present disclosure. In (a) of FIG. 6, when the steering device 130 is not operated at the beginning, the steering angle SA is 0, and the wheelbase is the largest under the circumstances. After that, the steering device 130 is gradually operated, and the first wheelbase setting part 114 sets the first wheelbase L1 in such a way that the larger the current steering angle SA is, the smaller the value of the first wheelbase L1 is (using steering angle map on the left of FIG. 5). When a vehicle with a long wheelbase turns at a low speed, the turning radius of the vehicle is larger. Under the circumstances, the vehicle may be set to control the brake force of each wheel in the operation mode of a short-wheelbase vehicle. When the operation amount of the steering device 130 gradually increases, the steering angle SA gradually increases, and the first wheelbase L1 gradually decreases. When the operation amount of the steering device 130 continues to increase, the steering angle SA also continues to increase, and the wheelbase further decreases.

Then, as shown in (b) of FIG. 6, if the obstacle detection part 116 detects the presence of an obstacle near the vehicle, and the contact judgment part 118 determines that the obstacle will be in contact with the vehicle, the first wheelbase setting part 114 switches to use the steering angle map on the right side of FIG. 5 to set the first wheelbase L1. Thereafter, as shown in (b) of FIG. 6 and (c) of FIG. 6, the first wheelbase setting part 114 sets the first wheelbase L1 so that the larger the steering angle SA is, the larger the first wheelbase L1 is. In other words, when an obstacle that might come into contact with the vehicle is detected, the vehicle is turned with a larger turning radius.

Similarly, in this embodiment, when obstacle avoidance is performed, the target yaw moment M_dem is also applied while operating the steering device 130 to make the turning radius larger. In this way, the vehicle may turn along the trajectory C1 (the driving route of the vehicle illustrated in dashed line) to avoid contact with obstacles.

In this example, when the vehicle is involved in a risk of contact with an obstacle, the first wheelbase L is increased to perform brake force distribution control of the wheels of the vehicle, thereby avoiding contact (collision) with the obstacle. Under the circumstances, the first wheelbase L1 may be set longer than the second wheelbase L2 which is an inherent value of the vehicle.

According to a variation of the embodiment of the present disclosure, when the vehicle is in reverse gear, the brake force may be applied only to the inner side of the turn of the rear wheels of the vehicle. As a result, the vehicle's turning performance may be improved compared to the condition of applying the brakes both when the vehicle is moving forward and backward.

In addition, this embodiment may also change the first wheelbase L1 when the vehicle is driving on a slope or a low-friction road surface to improve the turning performance of the vehicle.

Furthermore, in the above embodiment, the imaginary wheelbase is changed according to the steering angle, but the imaginary wheelbase in the driver's preference may also be changed through a human machine interface (HMI) switch or the like.

In the above embodiment, the method of using brake force is described as a method of changing the imaginary wheelbase. However, any method using brake force and the method of using left and right brake/driving force control through motor driving may be used for implementation. Finally, it should be noted that the above embodiments are only used to illustrate the technical solution of the present disclosure, but not to limit it. Although the present disclosure has been described in detail with reference to the foregoing embodiments, those of ordinary skill in the art should understand that: The technical solutions described in the foregoing embodiments can still be modified, or some or all of the technical features can be equivalently replaced; and these modifications or substitutions do not deviate from the essence of the corresponding technical solutions from the scope of the technical solutions of the embodiments of the present disclosure.

What is claimed is:

1. A brake force distribution device for a vehicle, comprising:

a turning state detection part comprising a sensor and disposed to detect whether the vehicle is in a turning state based on a driving state of the vehicle;

a vehicle speed detection part comprising another sensor and disposed to detect whether a vehicle speed is equal to or less than a prescribed threshold; and a processor configured to:

calculate a first yaw moment based on the driving state, the vehicle speed and a first wheelbase of the vehicle, wherein the first wheelbase is an imaginary wheelbase of the vehicle;

calculate a second yaw moment based on the driving state and the vehicle speed as well as based on a second wheelbase which is an inherent value of the vehicle;

calculate a target moment based on a difference between the first yaw moment and the second yaw moment; and control brake force distribution of wheels of the vehicle based on the target moment;

wherein the processor controls the brake force distribution of the wheels based on the target moment when the vehicle turns and the vehicle speed is equal to or less than the prescribed threshold.

2. The brake force distribution device for the vehicle according to claim 1, wherein the driving state comprises: a steering angle, the brake force distribution device for the vehicle further comprises: a first wheelbase setting part that comprises a steering angle map and sets the first wheelbase based on the steering angle, when the vehicle turns and the vehicle speed is below the prescribed threshold, the first wheelbase setting part is set such that the first wheelbase is less than or equal to the second wheelbase, and within a prescribed interval, the first wheelbase is set in such a way that the greater the current steering angle is, the smaller a value of the first wheelbase is.

3. The brake force distribution device for the vehicle according to claim 2, wherein the first wheelbase has a hysteresis characteristic, when the steering angle increases and the steering angle becomes a first threshold, the first wheelbase is set to a minimum value, and then, when the steering angle decreases and becomes a second threshold less than the first threshold, the first wheelbase increases from the minimum value, and the decreased steering angle increase less as compared with the increased steering angle.

4. The brake force distribution device for the vehicle according to claim 1, further comprising:

an obstacle detection part comprising a camera and detecting obstacles around the vehicle, wherein the processor determines a possibility of the obstacle coming into contact with an inner side of a turning direction of the vehicle based on the obstacle; and a first wheelbase setting part comprising a steering angle map and setting the first wheelbase based on a judgment result of the processor, when the vehicle is turning and the vehicle speed is equal to or less than the prescribed threshold, and it is determined that there is the possibility of contact between the obstacle and the vehicle, the first wheelbase setting part sets the first wheelbase to a value greater than a current value.

5. The brake force distribution device for the vehicle according to claim 4, further comprising:

the driving state comprising: a steering angle, wherein the first wheelbase setting part sets the first wheelbase based on the judgment result of the processor and the steering angle, when the vehicle is turning and the vehicle speed is equal to or less than the prescribed threshold and the processor determines that there is the possibility of contact between the obstacle and the vehicle, the first wheelbase setting part is set in such a way that the first wheelbase is greater than or equal to the second wheelbase, and within a prescribed interval, the first wheelbase is set in such a way that the greater the current steering angle is, the greater the value of the first wheelbase is.

6. A brake force distribution method for a vehicle, comprising:

detecting whether the vehicle is in a turning state based on a driving state of the vehicle;

detecting whether a vehicle speed of the vehicle is equal to or less than a prescribed threshold;

calculating a first yaw moment based on the driving state, the vehicle speed and a first wheelbase of the vehicle, wherein the first wheelbase is an imaginary wheelbase of the vehicle;

calculating a second yaw moment based on the driving state and the vehicle speed as well as based on a second wheelbase which is an inherent value of the vehicle;

calculating a target moment based on a difference between the first yaw moment and the second yaw moment; and controlling a brake force distribution of wheels of the vehicle based on the target moment when the vehicle turns and the vehicle speed is equal to or less than the prescribed threshold.

7. The brake force distribution method for the vehicle according to claim 6, wherein the driving state comprises: a steering angle, the brake force distribution method for the vehicle comprises: setting the first wheelbase based on the steering angle, when the vehicle turns and the vehicle speed is below the prescribed threshold, the first wheelbase is set such that the first wheelbase is less than or equal to the second wheelbase, and within a prescribed interval, the first wheelbase is set in such a way that the greater the current steering angle is, the smaller a value of the first wheelbase is.

8. The brake force distribution method for the vehicle according to claim 7, wherein the first wheelbase has a hysteresis characteristic, when the steering angle increases and the steering angle becomes a first threshold, the first wheelbase is set to a minimum value, and then, when the steering angle decreases and becomes a second threshold less than the first threshold, the first wheelbase increases from the minimum value, and the decreased steering angle increase less as compared with the increased steering angle.

9. The brake force distribution method for the vehicle according to claim 6, further comprising:

detecting obstacles around the vehicle;

determining a possibility of the obstacle coming into contact with an inner side of a turning direction of the vehicle to obtain a judgment result;

setting the first wheelbase based on the judgment result; and when the vehicle is turning and the vehicle speed is equal to or less than the prescribed threshold, and it is determined that there is the possibility of contact between the obstacle and the vehicle, the first wheelbase is set to a value greater than a current value.

10. The brake force distribution method for the vehicle according to claim 9, wherein the driving state comprises: a steering angle, the brake force distribution method for the vehicle further comprises:

setting the first wheelbase based on the judgment result and the steering angle; and when the vehicle turns and the vehicle speed is equal to or less than the prescribed threshold, and under an occasion where a contact judgment part judges that there is a possibility of contact between the obstacle and the vehicle, the first wheelbase is set such that the first wheelbase is greater than or equal to the second wheelbase, and within a prescribed interval, the first wheelbase is set in such a way that the greater the current steering angle is, the greater a value of the first wheelbase is.

\* \* \* \* \*